United States Patent
Chanclou

(10) Patent No.: US 11,888,513 B2
(45) Date of Patent: Jan. 30, 2024

(54) OPTRONIC TRANSCEIVER MODULE WITH INTEGRATED PROTECTION

(71) Applicant: Orange, Issy-les-Moulineaux (FR)

(72) Inventor: Philippe Chanclou, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/849,479

(22) Filed: Jun. 24, 2022

(65) Prior Publication Data

US 2022/0416885 A1    Dec. 29, 2022

(30) Foreign Application Priority Data

Jun. 25, 2021 (FR) ........................ 2106823

(51) Int. Cl.

| | |
|---|---|
| H04B 10/00 | (2013.01) |
| H04B 10/038 | (2013.01) |
| H04B 10/25 | (2013.01) |
| H04B 10/032 | (2013.01) |
| H04B 10/079 | (2013.01) |
| H04B 10/40 | (2013.01) |
| H04J 14/00 | (2006.01) |

(52) U.S. Cl.
CPC ......... *H04B 10/038* (2013.01); *H04B 10/032* (2013.01); *H04B 10/07955* (2013.01); *H04B 10/2589* (2020.05); *H04B 10/40* (2013.01)

(58) Field of Classification Search
CPC ....... H04B 10/032; H04B 10/40; H04B 10/43
See application file for complete search history.

(56) References Cited

U.S. PATENT DOCUMENTS

| | | | |
|---|---|---|---|
| 2003/0081279 A1* | 5/2003 | Uchino | H04B 10/032 398/5 |
| 2008/0131124 A1 | 6/2008 | Nam et al. | |
| 2013/0156417 A1 | 6/2013 | Chou et al. | |
| 2021/0063647 A1* | 3/2021 | Jones | H04B 10/07 |

FOREIGN PATENT DOCUMENTS

| | | |
|---|---|---|
| EP | 1 041 852 A2 | 10/2000 |
| EP | 2 518 912 A1 | 10/2012 |

OTHER PUBLICATIONS

French Search Report for French Application No. FR2106823, dated Mar. 4, 2022.
Written Opinion on the Patentability of the Invention for French Application No. 2106823, dated Mar. 24, 2022.

\* cited by examiner

*Primary Examiner* — Daniel G Dobson
(74) *Attorney, Agent, or Firm* — Knobbe, Martens, Olson & Bear, LLP

(57) ABSTRACT

An optronic transceiver module capable of implementing an optical bidirectional communication of the point to point type via at least one main optical fibre is disclosed. The optronic transceiver module includes a first optical module for supervising an uplink signal received via the main optical fibre delivering a first supervision result, a first optical module for switching the bidirectional communication via the main optical fibre to a bidirectional communication via a backup optical fibre, and vice versa, the first optical switching module being controlled by the first optical supervision module depending on the first supervision result delivered.

13 Claims, 7 Drawing Sheets

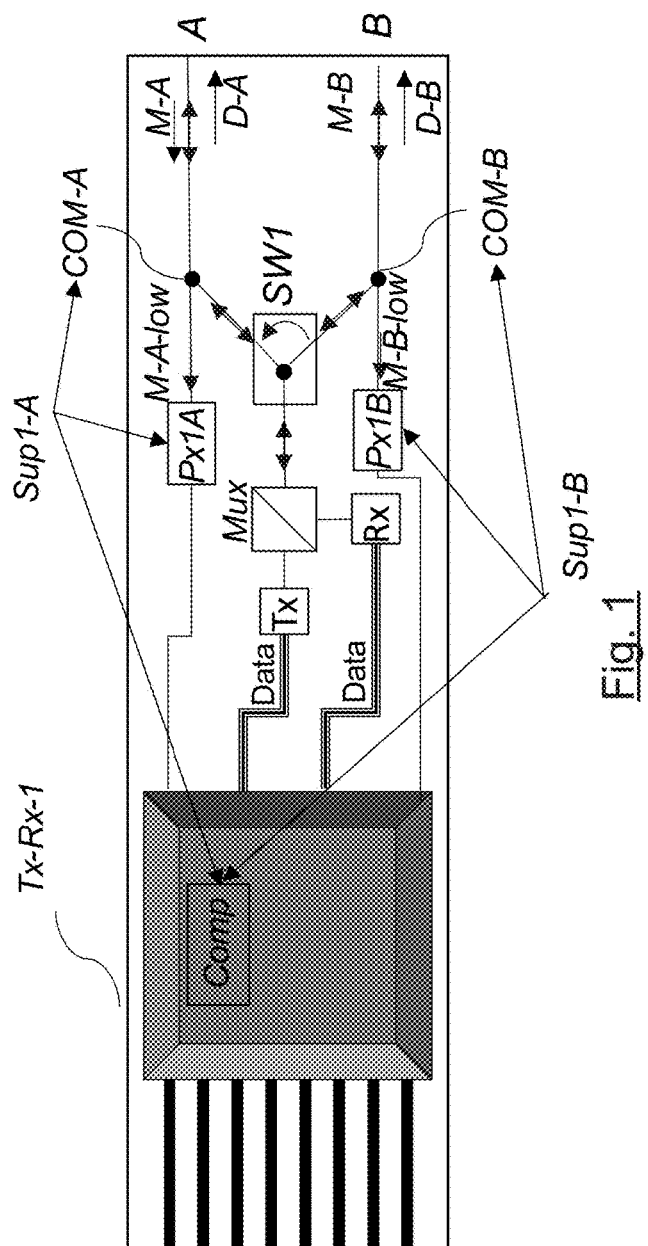
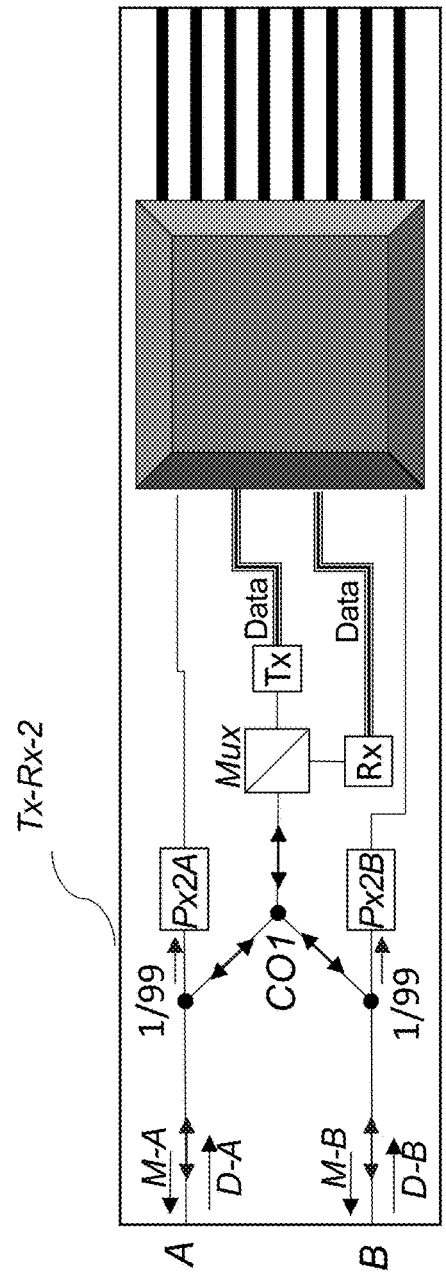
Fig. 1
Fig. 2

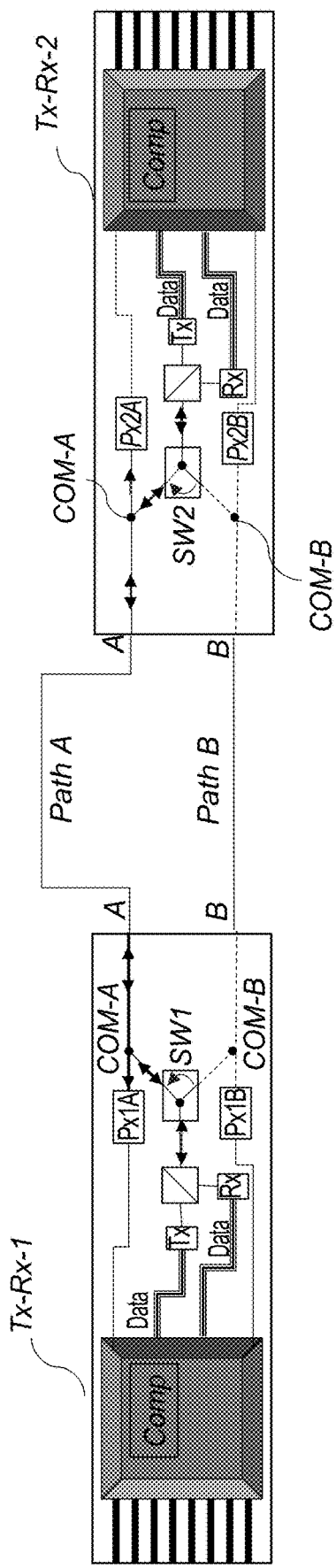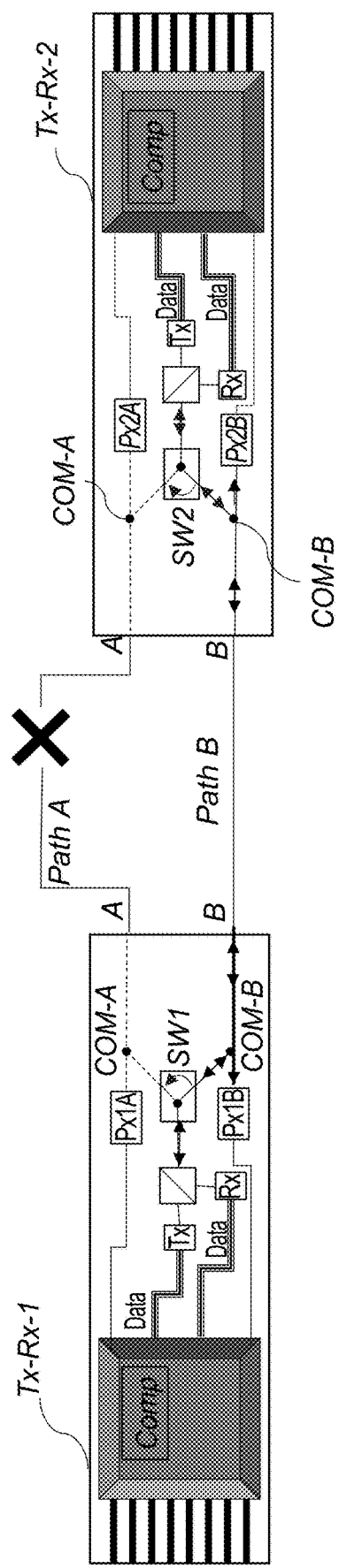
Fig. 6a
Fig. 6b

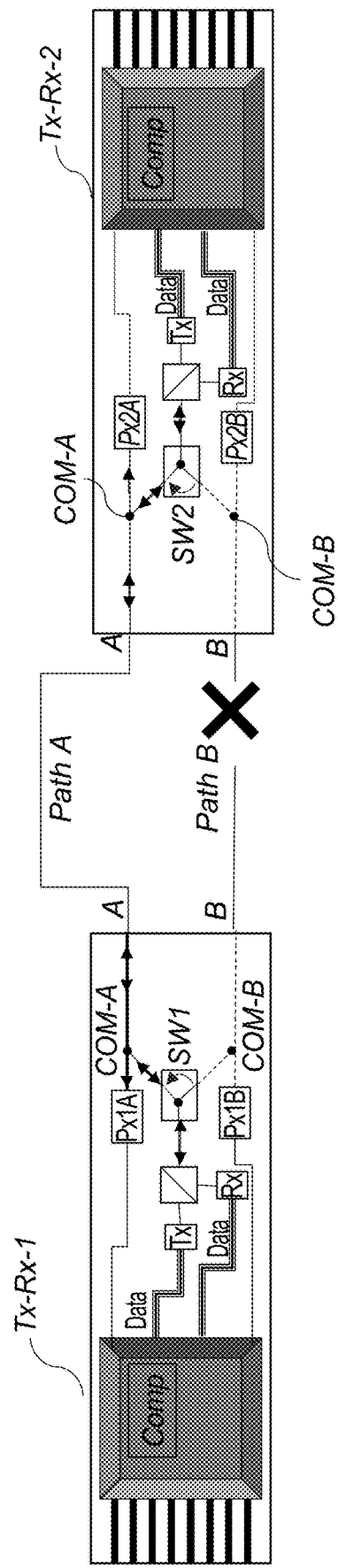

OPTRONIC TRANSCEIVER MODULE WITH INTEGRATED PROTECTION

CROSS-REFERENCE TO RELATED APPLICATIONS

This application claims foreign priority to French Patent Application No. FR 2106823, entitled "OPTRONIC TRANSCEIVER MODULE WITH INTEGRATED PROTECTION" and filed Jun. 25, 2021, the content of which is incorporated by reference herein in its entirety.

BACKGROUND

Field

The development is within the field of optical fibre telecommunications, and more particularly relates to optical signal transceiver modules in a passive optical network (PON) comprising an optical line terminal, to which are connected such transceiver modules, and a plurality of optical network terminals.

Description of the Related Technology

The aim of equipment referred to as optical line terminals (OLT) is to convert electrical signals into optical signals. Such an item of fibre access equipment (used in the last kilometres of the network to bring the fibre to clients) is connected to an optical fibre infrastructure, initially comprising an optical fibre that passes through powered optical couplers to connect a multitude of clients (typically sixty-four). The optronic module of the client is referred to as optical network unit (ONU) or terminal.

The development more particularly relates to the optronic transceiver module that is plugged into the OLT, to produce a point to point (PtP) connection as proposed in standards ITU-T G.985, G.986 and G.9806 at various bitrates. This optronic transceiver module comprises an electronic interface comprising electronic components and an optical interface comprising optical components. This optical interface particularly comprises an optical source (laser) modulated with downlink data (from the OLT to the ONUs) and of an optical receiver (photodiode) for receiving uplink data (from the ONUs to the OLT). The two optical signals, downlink and uplink, are bidirectional and propagate in a single optical fibre. These optical signals, downlink and uplink, use different wavelengths that are multiplexed/demultiplexed in the optronic transceiver.

Currently, optronic transceiver modules have an optical interface comprising a single optical fibre.

Within the scope of fibre access solutions of the point to point type, for example for professionals (high value added service) or mobile antennas (for 3G, 4G or 5G streams), a transceiver module is associated with an external device for protecting against optical fibre cutoffs making it possible to switch the optical signals to a second "backup" fibre. Such a protection solution therefore implements two distinct items of equipment, i.e. the transceiver module and the protection device, both on the OLT network equipment side (or central side) and on the client equipment side, in order to ensure switching from a main fibre to a backup fibre in the event of a problem detected on the main fibre.

However, this solution has a plurality of drawbacks. Indeed, it results in installation complexity, due to the connection of protection devices outside of the transceiver modules, as well as maintenance complexity, for the same reasons and also related to the fact that the two items of equipment must be managed and maintained independently, without counting on the fact that they may be provided by different manufacturers, involving different maintenance and update methods. Moreover, a transceiver module is configured to emit an alarm if it detects a problem in the transmission of the PtP connection whereas the protection device is configured to emit an alarm when it has detected a break in a physical link. Two alarms are therefore emitted for what corresponds in fact to a single problem, which is not optimal. Finally, this solution has a high cost due to the addition of the protection device, on the central side and on the client side.

Therefore, there is a need for a technique making it possible to offer a high value added optical fibre communication service having a backup solution in the event of problems on the main optical fibre that is simple and inexpensive to implement.

SUMMARY

The present technique meets this need by proposing an optronic transceiver module capable of implementing an optical bidirectional communication of the point to point type via at least one main optical fibre (A), and comprising:
- a first optical module for supervising (Sup1-A) an uplink signal received via the main optical fibre (A) delivering a first supervision result,
- a first optical module for switching (SW1) the bidirectional communication via the main optical fibre (A) to a bidirectional communication via a backup optical fibre (B), and vice versa, the first optical switching module (SW1) being controlled by the first optical supervision module (Sup1-A) depending on said first supervision result delivered.

Thus, the present technique is based on a novel and inventive solution of the protection of an optical bidirectional communication via a main optical fibre, making it possible to switch to a backup optical fibre, by implementing an optronic transceiver module (for example connected to an optical line terminal, on the network/central side) integrating the supervision of the fibre during use and the switching in the event of cutoff detection. The present technique advantageously takes advantage of the presence of a second fibre input-output on standard transceiver modules, instead of adding additional equipment performing the fibre switching.

On the client side, the present technique adapts to an unsupervised operation, according to the prior art or according to a first embodiment of the present technique, or a supervised operation similar to that implemented on the central side, according to a second embodiment.

According to a particular feature, the optronic transceiver module also comprises a second optical module for supervising (Sup1-B) an uplink signal received via the backup optical fibre (B) delivering a second supervision result and controlling said first optical switching module (SW1).

Thus, the two fibre inputs are supervised, in such a way as to be able to switch from a main fibre to a backup fibre, and vice versa when the main fibre is repaired. No other equipment is necessary in addition to the transceiver module on the central side to ensure this switching reciprocity.

For example, the first, respectively the second, optical supervision module (Sup1-A, Sup1-B) comprises:
- a first, respectively second, sampling uplink optical coupler (COM-A, COM-B) capable of splitting at least one uplink optical signal (M-A, M-B) received via the main optical fibre A, respectively the backup optical fibre (B), into two optical signal split according to a predetermined power ratio for said split optical signals, said first, respectively second, sampling uplink optical coupler (COM-A, COM-B) delivering a first, respectively second, low-power signal (M-A-low, M-B-low) and a first, respectively second, high-power signal (M-A-high, M-B-high), at least one first, respectively second, power measurement photodiode (PxA, PxB) delivering a first, respectively second, power measurement associated with a first, respectively second, low-power signal (M-A-low, M-B-low).

Thus, the supervision is implemented so as not to impact the processing of the useful signal, via optical elements making it possible to sample a very low percentage of the uplink signal received for measuring its power, via a photodiode for example. Subsequently, this power is compared to a predetermined threshold, by one or more electronic components. This comparison may be performed totally by the transceiver module on the central side, according to a first variant, or partially or totally in an external item of equipment. The supervision result subsequently makes it possible to command the fibre switching module.

According to a particular aspect, the first, respectively the second, optical supervision module (Sup1-A, Sup1-B) also comprises at least one comparator Comp delivering a comparison result of the first, respectively second, power measurement with at least one predetermined reference value, and comprising means for controlling the first optical switching module (SW1).

Thus, according to this first variant, the comparator controlling the switching module, from power measurements performed on the uplink signals, is also integrated into the transceiver module, so that the supervision and the switching are incorporated into the transceiver module on the network side.

For example, the means for controlling the first optical switching module (SW1) correspond to means for transmitting the comparison result to an entity external to said optronic transceiver module and where said optronic transceiver module comprises means for receiving, from said entity external to said optronic transceiver module, a command for controlling the first optical switching module (SW1).

Thus, according to this second variant, only the comparison of the power measurements with a threshold is implemented in the comparator of the transceiver module, the comparator subsequently transmitting the comparison results to an entity external to the transceiver module, which in return transmits to the transceiver module a switching command for the switching module. This variant takes advantage of the fact that there is a functionality in a transceiver module for transmitting diagnostic data to the OLT for example, or any other connected equipment, for example via an I2C bus, to transmit supervision data, here a comparison result.

According to a particular feature, the optronic transceiver module comprises means for transmitting the first, respectively second, power measurement to an entity external to said optronic transceiver module and means for receiving, from said entity external to said optronic transceiver module, a command for controlling the first optical switching module (SW1).

Thus, according to this third variant, the power measurements are transmitted directly to an external entity and the comparison with a threshold is carried out by this entity, which transmits in return to the transceiver module a switching command, when the comparison result is negative. This variant also takes advantage of the existing functionality described above to transmit power measurements to a remote entity.

The present technique also proposes a system for protecting a bidirectional communication of the point to point type via at least one main optical fibre (A) between an optical line terminal (OLT) and an item of client equipment (ONU) in an optical communication network, the protection system comprising at least one first optronic transceiver module (Tx-Rx-1) according to the various embodiments, connected to said optical line terminal and to said at least one main optical fibre (A) and at least one second optronic transceiver module (Tx-Rx-2) connected to said item of client equipment, where said second optronic transceiver module (Tx-Rx-2) is capable of receiving an uplink signal and emitting a downlink signal on the main optical fibre (A) and/or the backup optical fibre (B).

Thus, the present technique is based on a novel and inventive solution of the protection of an optical bidirectional communication via a main optical fibre, making it possible to switch to a backup optical fibre, by implementing a protection system comprising an optronic transceiver module connected to an optical line terminal integrating the supervision of the fibre during use and the switching in the event of cutoff detection, as described above, and an optronic transceiver module on the client side capable of receiving and transmitting an optical signal on one and/or the other of the main and backup fibres. In this way, the switching implemented on the network side does not impact the client side which is capable of receiving on one or other of the fibres used, without needing to know which is actually used. The system of the present development encompasses, on the network and client side, all of the embodiments of transceiver modules and means for controlling the switching module.

According to a first embodiment, said at least one second optronic transceiver module (Tx-Rx-2) comprises an optical interface comprising a transmitter module, a receiver module and a main optical coupler CO1, capable of splitting the downlink optical signal from the transmitter module into two downlink optical signals substantially of the same power to be transmitted respectively in the two optical fibres A and B, and capable of aggregating signals representative of the uplink signals received respectively via the optical fibres A and B, into a signal to be processed by the receiver module.

According to this first embodiment, the transceiver module on the client side does not incorporate supervision or switching and may receive and transmit via the two fibres, regardless of that on which the bidirectional communication is implemented.

According to a second embodiment, said at least one optronic transceiver module (Tx-Rx-2) comprises:
  a third optical module for supervising (Sup2-A) a signal received via the main optical fibre (A) delivering a third supervision result,
  a second optical module for switching (SW2) the bidirectional communication via the main optical fibre (A) to a bidirectional communication via a backup optical fibre (B), and vice versa, the second optical switching module (SW2) being controlled by the third optical supervision module (Sup2-A) depending on said third supervision result delivered.

According to this second embodiment, the transceiver module on the client side itself incorporates the supervision and a switching module, and operates as the transceiver module on the central side. This embodiment makes it possible to implement the same equipment on the central side and on the client side, thus simplifying the provision of equipment, the design and the installation of the infrastructure, as well as the operation and the protection of this infrastructure.

According to a particular aspect, said at least one second optronic transceiver module (Tx-kc-2) also comprises a second optical module for supervising (Sup2-B) a signal received via the backup optical fibre (B) delivering a fourth supervision result and controlling said second optical switching module (SW2). Therefore, the switching of the main fibre to the backup fibre and vice versa is possible thanks to a supervision of the signals received on the two fibres.

For example, the first optical switching module (SW1) and/or the second optical switching module (SW2) corresponds to an optical switch.

The present technique also relates to a method for protecting a bidirectional communication of the point to point type via at least one main optical fibre (A) between an optical line terminal (OLT), by means of at least one first optronic transceiver module (Tx-Rx-1), and an item of client equipment (ONU), by means of at least one second optronic transceiver module (Tx-Rx-2), in an optical communication network, the method comprising the following steps, implemented in said at least one first optronic transceiver module (Tx-Rx-1):
  first supervision (E12) of said bidirectional communication via the main optical fibre (A) by comparing the optical power received with an optical power reference value delivering a negative comparison result if the optical power received is below the optical power reference value,
  switching (E12) of the bidirectional communication to a bidirectional communication via a backup optical fibre (B) between the first optronic transceiver module (Tx-Rx-1) and the second optronic transceiver module (Tx-Rx-2) if the comparison result is negative.

For example, the first supervision is implemented periodically according to a predetermined period and where the switching is implemented when a predetermined number of negative comparison results are delivered by the first supervision.

In addition, the method for protecting a bidirectional communication comprises the following steps, implemented in said at least one second optronic transceiver module (Tx-Rx-2):
  second supervision of said bidirectional communication via the main optical fibre (A) by comparing the optical power received with an optical power reference value delivering a negative comparison result if the optical power received is below the optical power reference value,
  switching of the bidirectional communication to a bidirectional communication via the backup optical fibre (B) if the comparison result is negative.

For example, the second supervision is implemented periodically according to a predetermined period and where the switching is implemented when a predetermined number of negative comparison results are delivered by the second supervision.

The transceiver modules described according to the various embodiments of the present technique, as well as the protection system, are capable of implementing respectively the steps of the method described in relation to the various embodiments.

BRIEF DESCRIPTION OF THE DRAWINGS

Other aims, features and advantages of the development will become more apparent upon reading the following description, given by way of simple illustrative, and non-limiting example, in relation to the figures, wherein:
FIG. 1 shows an example of an optronic transceiver module on the central side according to one embodiment of the present technique;
FIG. 2 shows an example of an optronic transceiver module on the client side according to a first embodiment of the present technique;
FIG. 6a, FIG. 6b and FIG. 6c illustrate three operating situations of a protection system according to a second embodiment of the present technique.

DETAILED DESCRIPTION OF CERTAIN ILLUSTRATIVE EMBODIMENTS

Figure 3A:
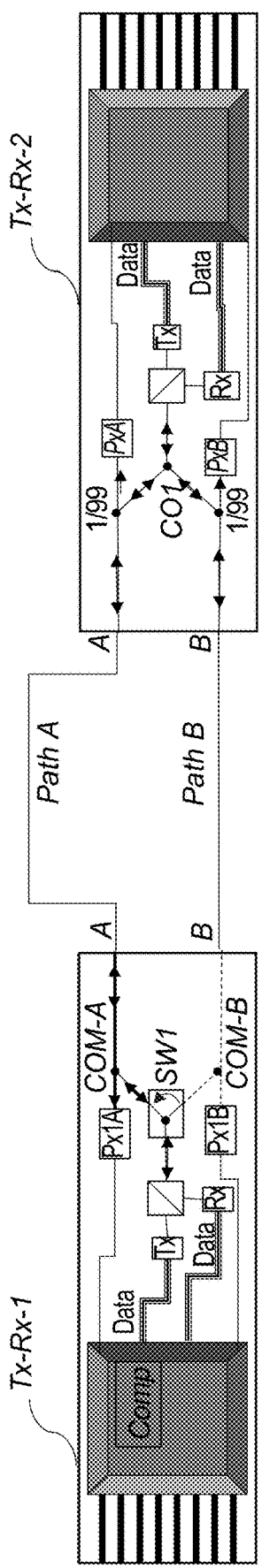
FIG. 3a, FIG. 3b and FIG. 3c illustrate three operating situations of a protection system according to a first embodiment of the present technique.

The main principle of the present development is based on the implementation of an optical switching module integrated into an optronic transceiver module on the network/central side, associated with an optical module for supervising the power of the incident signal received, to make it possible to detect a failure on the optical fibre used for the bidirectional communication, of the point to point type, ongoing between an item of equipment on the network/client side and an item of equipment on the client side. Thus, the switching to a backup optical fibre, when the main optical fibre has a defect (for example a cutoff), is implemented directly inside the optronic transceiver module on the central side, without requiring external elements and without modifying the structure of the housing of the optronic transceiver module. Indeed, such a module is equipped with a second fibre input-output, which is therefore used, according to the present technique, to implement a backup bidirectional communication via a second fibre. It should be noted that the present technique also applies to modules equipped with n fibre input-output interfaces, so as to be able to provide a plurality of backup paths in the event of cutoff of the main fibre and of the first backup fibre for example. A configuration with a main fibre A and a backup fibre B is subsequently described.

The two fibres are connected on the client side, where the transceiver device is able to process the optical signals regardless of the fibre used (main or backup). Techniques are known to implement such a device on the client side, but it is advantageous that a second optronic transceiver module according to the present technique (according to two embodiments) is also implemented on the client side, in order to be better able to adapt the reception and transmission to one or other of the fibres (main or backup).

Thus, the present technique makes it possible to integrate the function of protecting the bidirectional communication, and therefore the function of switching to a backup link, directly in the optronic transceiver module provided on the central side, thus reducing, in relation to current techniques, the complexity of implementing the protection, the maintenance complexity and the associated costs. In addition, as will be seen hereafter, this same equipment detects a problem in the transmission of the PtP connection and a problem on the optical link, thus optimising the management of the problems detected.

As illustrated in FIG. 1, a first optronic transceiver module Tx-Rx-1 intended to be connected to an item of OLT network equipment comprises an electronic interface and of an optical interface particularly comprising a transmitter Tx and receiver Rx module on two different wavelengths, making a bidirectional communication possible, and of a wavelength multiplexing element making the differentiated processing of the optical signal received and of the optical signal to be transmitted possible.

Moreover, according to the present technique, the optical interface of the optronic transceiver module connected to the item of OLT network equipment, also comprises an optical switching module SW1 making it possible to switch the bidirectional communication of the fibre A to the fibre B and vice versa, depending on an optical supervision implemented on the power of the uplink signal received via the fibre A, respectively the fibre B. The switching module SW1 corresponds for example to an optical switch controlled by a signal generated depending on the optical supervision result.

The optical supervision for its part is implemented by an optical supervision module Sup1-A particularly comprising a sampling uplink optical coupler COM-A, for example of the 1/99 type, that is to say sampling $1/100^{th}$ of the uplink signal received from the fibre A, respectively B, to perform a power measurement, for example via a photodiode of the metre power type. The remainder of the uplink signal, that is to say the $99/100^{th}$ output from the sampling uplink optical coupler are received by the optical switching module SW1 for conventional processing of the signal received. The power measured by the photodiode is subsequently compared to a reference value, for example a predetermined threshold below which a failure of the fibre concerned A, respectively B, is detected. This comparison and this detection are implemented by a comparator comprising or connected to means for controlling the switching module SW1.

This comparator is for example an electronic component capable of comparing an electrical signal representative of the optical power received by the photodiode with a previously determined electronic threshold, to generate a warning, in the form of a signal to be transmitted to an input for controlling the switching module.

According to a first variant, illustrated in FIG. 1 particularly, the comparator Comp is entirely integrated into the electronic interface of the transceiver module Tx-Rx-1 and thus generates, as output, a signal for commanding the switching module SW1, to change the optical fibre, both into transmission and into reception, if the received signal is lower than a threshold also saved in a memory of the transceiver module Tx-Rx-1.

According to a second variant, all or part of the comparator is externalised, in an external control module, receiving as input, from the transceiver module Tx-kc-1, the optical power value measured by the photodiode, or directly the result of the comparison with a reference threshold, and generating an alarm transmitted to the transceiver module Tx-Rx-1 to an input for controlling the switching module SW1. It should be noted that the reference threshold may be fixed or entered by the external control module. The external control module is therefore able to read, receive and write information in the optronic transceiver module. This information is the values representing the optical power measured for each of the fibres, an alarm from comparators, a state of the switching of the optical switch, a writing of a reference threshold for the comparator. Indeed, an exchange channel exists making it possible to exchange data for managing the transceiver module, for example for the "Digital Optical Monitoring" (DOM) functionality information, at the same time as the channel that transmits the Ethernet-type data for example. In this variant, the external control module may be included in the OLT. It is also possible that the OLT acts as a relay to another item of equipment such as a server that would host the controller.

Thus, the optical power measurement (in one and/or the other of the two channels) may be added in a list of diagnostic parameters exchanged between the transceiver module and the OLT or ONU equipment. Indeed, the transceiver modules support diagnostic functions (for example "Digital Diagnostics Monitoring" or DDM) in accordance with industry standards. The diagnostic monitoring controller is available via an I2C bus. In addition, the "Digital Optical Monitoring" (DOM) functionality particularly makes it possible for the OLT (or ONU) equipment to read the parameters, such as the optical output power, the optical input power, the temperature and the power voltage of the transceiver module, in real time. This DOM functionality is therefore used in the second variant for transmitting the power value(s) measured by the photodiode(s), or directly the result(s) of the comparison with a reference threshold, from the transceiver module to the control module.

A second optical supervision module Sup1-B, similar, is implemented for the signal received via the fibre B.

This first optronic transceiver module Tx-Rx-1 illustrated in FIG. 1 is common to the two embodiments described hereafter, implementing two variants of optronic transceiver module on the client side, i.e. intended to be connected to an item of client equipment of the ONU type, noted hereafter second optronic transceiver module Tx-Rx-2.

According to a first embodiment, illustrated in FIG. 2, the second optronic transceiver module Tx-Rx-2 comprises an electronic interface and of an optical interface particularly comprising a transmitter Tx and receiver Rx module on two different wavelengths, making bidirectional communication possible, and of a wavelength multiplexing element making the differentiated processing of the optical signal received and of the optical signal to be transmitted possible.

Moreover, according to the present technique, the optical interface of the second optronic transceiver module Tx-Rx-2 also comprises a main optical coupler CO1, capable of splitting the optical signal from the transmitter module Tx into two optical signals substantially of the same power to be transmitted respectively in the two optical fibres A and B. In addition, this main optical coupler CO1 is also capable of aggregating signals representative of the signals received respectively via the optical fibres A and B, into a signal to be processed by the receiver module Rx.

Optionally, this second optronic transceiver module Tx-Rx-2 also comprises at least one optical supervision module particularly comprising a sampling uplink optical coupler of the 1/99 type, that is to say sampling $1/100^{th}$ of the uplink signal received from the fibre A, respectively B, to perform a power measurement, for example via a photodiode of the metre power type Px2A. The remainder of the uplink signal, that is to say the $99/100^{th}$ output from the sampling uplink optical coupler are received by the main optical coupler CO1, for conventional processing of the signal received. This optical supervision module particularly makes it possible, at the time of an acceptance testing of the installation or maintenance of the system, to determine if the fibre connected to the input-output A on the OLT central equipment side is connected to the input-output A or B on the ONU client equipment side. Indeed, it is very common that the fibres are crossed at the time of the installation of the infrastructure, without impact on the operation from the moment the crossing is identified as soon as it is put into service. The supervision makes this identification possible.

A second optical supervision module, similar, is implemented for the signal received via the fibre B.

Figure 3B:
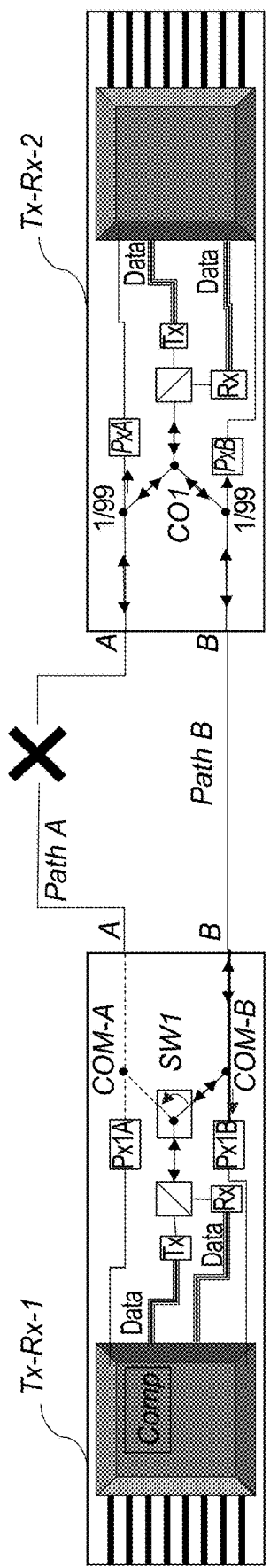
Figure 3C:
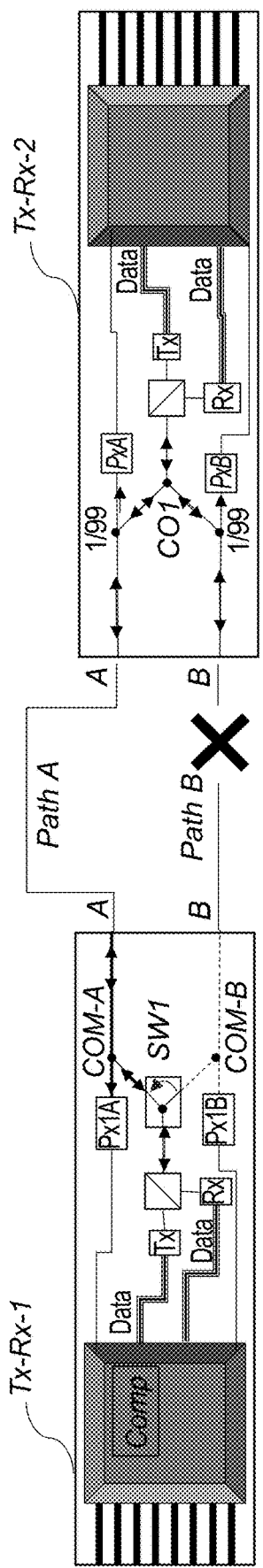

Before describing the switching method in more detail, FIGS. 3a to 3c illustrate the protection system according to this first embodiment, for the following three situations:

FIG. 3a: the bidirectional communication is initiated on the optical fibre A, the switching module of the first transceiver module Tx-Rx-1 is therefore in a position in which the signal transmitted by the Tx module is directed to the fibre A and the signal received by the fibre A is directed to the Rx module. No signal is transmitted on the fibre B by the first transceiver module Tx-kc-1 and a possible signal that would be received via the fibre B by the first transceiver module Tx-Rx-1 is not processed (this is represented by a dotted line inside the first transceiver module Tx-Rx-1). On the other hand, on the client side, the second optronic transceiver module Tx-Rx-2 processes the signals received on the two fibres A and B, aggregates them via the optical coupler CO1, to process them in the Rx module. In the present case, no signal is received via the fibre B and therefore only the signal received via the fibre A is processed. Finally, the signal generated by the Tx module of this second optronic transceiver module Tx-Rx-2 is split into two signals of the same power by the optical coupler CO1, in order to be transmitted on the two fibres A and B. The second optronic transceiver module Tx-Rx-2 in fact has no knowledge of the fibre on which the bidirectional communication is implemented.

FIG. 3b: the supervision module of the first transceiver module Tx-Rx-1 has detected a cutoff of the fibre A, and has therefore commanded the switching module so that it changes position and is in a position in which the signal transmitted by the Tx module is directed to the fibre B and the signal received from the fibre B is directed to the Rx module. No signal is transmitted on the fibre A by the first transceiver module Tx-Rx-1 (this is represented by a dotted line inside the first transceiver module Tx-Rx-1). On the client side, the operation is identical to that described in relation to FIG. 3a, with the exception that it does not receive signals via the fibre A.

FIG. 3c: the supervision module of the first transceiver module Tx-Rx-1 has detected a cutoff of the fibre B, on which the bidirectional communication has switched previously, and has therefore commanded the switching module so that it again changes position and is in a position in which the signal transmitted by the Tx module is directed to the fibre A and the signal received from the fibre A is directed to the Rx module. No signal is transmitted on the fibre B by the first transceiver module Tx-Rx-1 (this is represented by a dotted line inside the first transceiver module Tx-Rx-1). On the client side, the operation is always identical to that described in relation to FIG. 3a.

Figure 4:
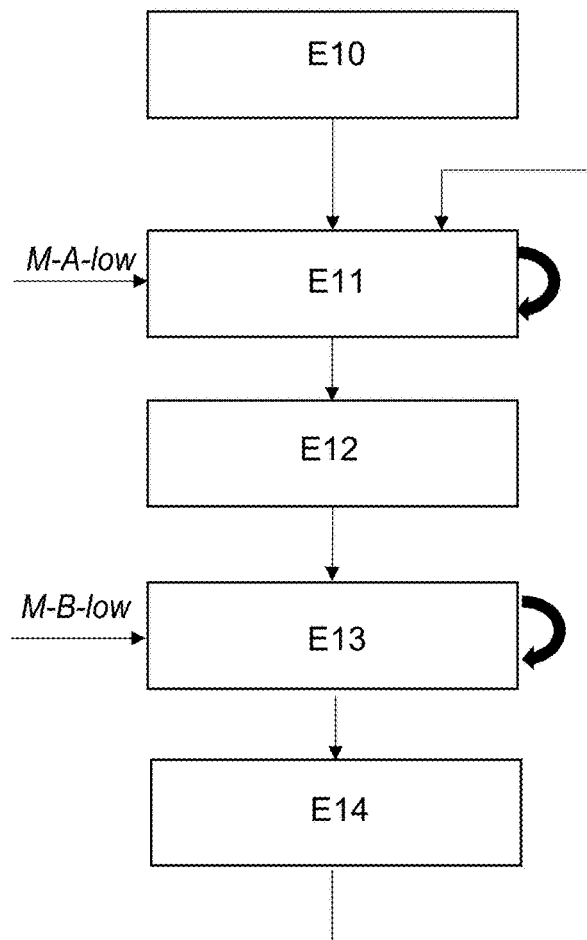
FIG. 4 illustrates the main steps of a method for protecting a bidirectional communication according to a first embodiment of the present technique.

It is therefore now described, still according to this first embodiment, the steps of the method for protecting the bidirectional communication implementing the switching of a fibre A to a fibre B, as illustrated in FIG. 4. A first step E10 of initiating the bidirectional communication on the main fibre A is therefore implemented with a first supervision E11 of this bidirectional communication via the main optical fibre A. This supervision, described in detail above, is performed by comparing the optical power received with an optical power reference value delivering a negative comparison result if the optical power received is below the optical power reference value. Switching E12 of the bidirectional communication to a bidirectional communication via a backup optical fibre B therefore takes place if the comparison result is negative.

Supervision E13 of the bidirectional communication via the main optical fibre B is therefore implemented, described in detail above, by comparing the optical power received with an optical power reference value delivering a negative comparison result if the optical power received is below the optical power reference value. Switching E14 of the bidirectional communication to a bidirectional communication via a main optical fibre A therefore takes place if the comparison result is negative and thus iteratively, whenever a cutoff is detected on the fibre implementing the current bidirectional communication.

According to one variant, the supervision is implemented periodically and the switching is only performed when a predetermined number of negative supervision results is exceeded. This makes it possible to monitor, during a certain duration, for example in the order of a few milliseconds, the signal received via the fibre on which the bidirectional communication is ongoing and to only perform the switching when a cutoff is proven and not following an isolated problem on the fibre.

All of these steps are implemented by the first transceiver module Rx-Tx-1, and the second transceiver module Rx-Tx-2 operates as described above by processing the signals received via the two fibres and also by transmitting on the two fibres. Thus, this embodiment makes it possible to offer protection of the bidirectional communication implemented, thanks to switching to a backup fibre if a cutoff is detected on the main fibre, with the supervision only on the central side.

Figure 5:
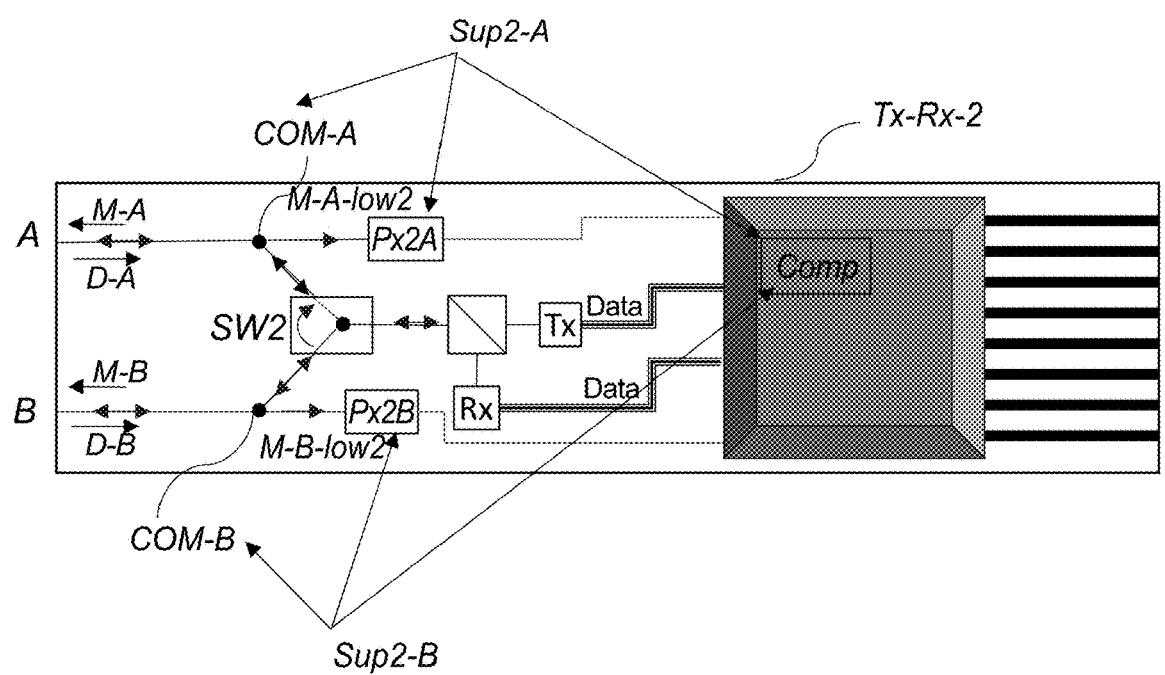
FIG. 5 shows an example of an optronic transceiver module on the client side according to a second embodiment of the present technique.

According to a second embodiment, illustrated in FIG. 5, the second optronic transceiver module Tx-Rx-2 intended to be connected to an item of ONU client equipment comprises an electronic interface and of an optical interface particularly comprising a transmitter Tx and receiver Rx module on two different wavelengths, making bidirectional communication possible, and of a wavelength multiplexing element making the differentiated processing of the optical signal received and of the optical signal to be transmitted possible.

Moreover, according to the present technique, the optical interface of the optronic transceiver module Tx-Rx-2 connected to the OLT network equipment, also comprises an optical switching module SW2 making it possible to switch the bidirectional communication of the fibre A to the fibre B and vice versa, depending on an optical supervision implemented on the power of the signal received via the fibre A, respectively the fibre B. The switching module SW2 corresponds for example to an optical switch controlled by a signal generated depending on the optical supervision result.

As for the optronic transceiver module Tx-Rx-1 described above, the optical supervision for its part is implemented by an optical supervision module Sup2-A particularly comprising a sampling uplink optical coupler, for example of the $1/99$ type, that is to say sampling $1/100^{th}$ of the uplink signal received from the fibre A, respectively B, to perform a power measurement, for example via a photodiode of the metre power type. The remainder of the uplink signal, that is to say the $99/100^{th}$ output from the sampling uplink optical coupler are received by the optical switching module SW2 for conventional processing of the signal received. The power measured by the photodiode is subsequently compared to a reference value, for example a predetermined threshold below which a failure of the fibre concerned A, respectively B, is detected. This comparison and this detection are implemented by a comparator comprising or connected to means for controlling the switching module SW2.

This comparator is for example an electronic component capable of comparing an optical power measurement from the photodiode with a previously determined threshold to generate a warning, in the form of a measurement to be transmitted to an input for controlling the switching module. The same variants as those described in relation to the first embodiment are possible and not described again here.

A second optical supervision module Supt-B, similar, is implemented for the signal received via the fibre B.

It should be noted that this optical power measurement (in one and/or the other of the two channels) may be added in a list of diagnostic parameters exchanged between the transceiver module and the OLT equipment. Indeed, the transceiver modules support diagnostic functions (for example "Digital Diagnostics Monitoring" or DDM) in accordance with industry standards. The diagnostic monitoring controller is available via an I2C bus. In addition, the "Digital Optical Monitoring" (DOM) functionality particularly makes it possible for the OLT equipment to read the parameters, such as the optical output power, the optical input power, the temperature and the power voltage of the transceiver module, in real time.

Before describing the switching method in more detail, FIGS. 5a to 5c illustrate the protection system according to this first embodiment, for the following three situations:

FIG. 5a: the bidirectional communication is initiated on the optical fibre A, the switching module of the first transceiver module Tx-Rx-1 is therefore in a position in which the signal transmitted by the Tx module is directed to the fibre A and the signal received by the fibre A is directed to the Rx module. No signal is transmitted on the fibre B by the first transceiver module Tx-Rx-1 and a possible signal that would be received via the fibre B by the first transceiver module Tx-Rx-1 is not processed (this is represented by a dotted line inside the first transceiver module Tx-Rx-1). Similarly, on the client side, the switching module of the second transceiver module Tx-Rx-2 is in a position in which the signal transmitted by the Tx module is directed to the fibre A and the signal received from the fibre A is directed to the Rx module. No signal is transmitted on the fibre B by the second transceiver module Tx-Rx-2 and a possible signal that would be received via the fibre B by the second transceiver module Tx-Rx-2 is not processed (this is represented by a dotted line inside the second transceiver module Tx-Rx-2). The two transceiver modules Tx-kc-1 et Tx-Rx-2 therefore operate in the same way and the backup fibre B is not used, so long as the bidirectional communication on the fibre A is optimal and that no malfunction of this link is detected.

FIG. 5b: the supervision module of the first transceiver module Tx-Rx-1 has detected a cutoff of the fibre A, and has therefore commanded the switching module so that it changes position and is in a position in which the signal transmitted by the Tx module is directed to the fibre B and the signal received from the fibre B is directed to the Rx module. No signal is transmitted on the fibre A by the first transceiver module Tx-Rx-1 (this is represented by a dotted line inside the first transceiver module Tx-Rx-1). On the client side, the operation is identical because the second transceiver module Tx-kc-2 is also capable of detecting a cutoff on the fibre A, via its supervision module, and of switching to the fibre B, during transmission and reception.

FIG. 5c: the supervision module of the first transceiver module Tx-Rx-1 has detected a cutoff of the fibre B, on which the bidirectional communication has switched previously, and has therefore commanded the switching module so that it again changes position and is in a position in which the signal transmitted by the Tx module is directed to the fibre A and the signal received from the fibre A is directed to the Rx module. No signal is transmitted on the fibre B by the first transceiver module Tx-Rx-1 (this is represented by a dotted line inside the first transceiver module Tx-Rx-1). On the client side, the same switching is performed, after detection of a cutoff on the link B.

Figure 7:
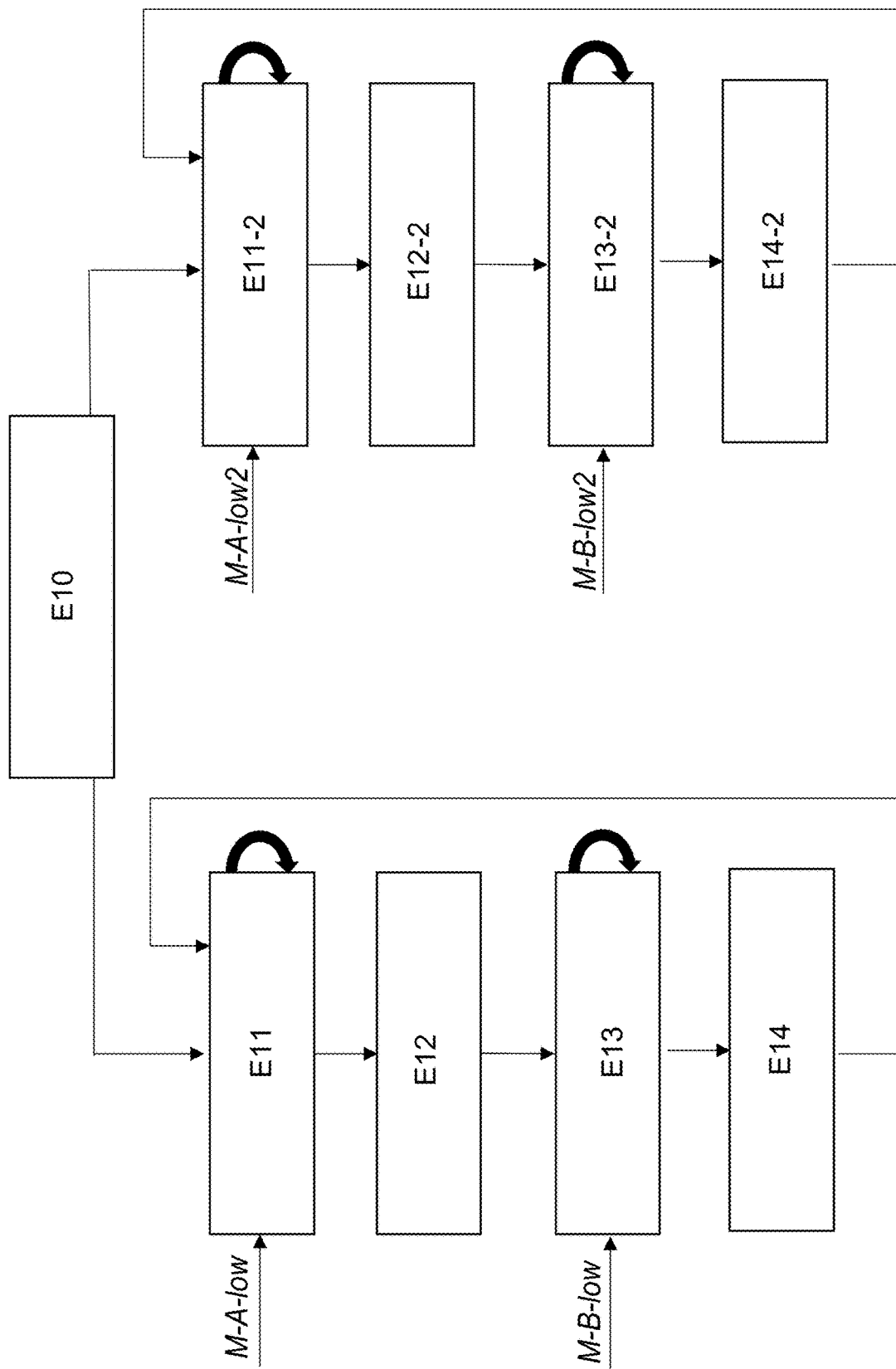
FIG. 7 illustrates the main steps of a method for protecting a bidirectional communication according to a second embodiment of the present technique.

It is therefore now described, still according to this second embodiment, the steps of the method for protecting the bidirectional communication implementing the switching of a fibre A to a fibre B, as illustrated in FIG. 7.

The steps described above, in relation to FIG. 4, implemented on the central side, are identical.

On the other hand, the operation on the client side is different because the second transceiver module Rx-Tx-2 itself also comprises supervision modules and a switching module. Steps E11-2, E12-2, E13-2 and E14-2, implemented in this second transceiver module Rx-Tx-2 are therefore the same as those implemented in the first transceiver module kc-Tx-1.

In the same way as for the first embodiment, the supervision is implemented periodically, both on the central side and on the client side, and the switching is only performed when a predetermined number of negative supervision results is exceeded. This makes it possible to monitor, during a certain duration, for example in the order of a few milliseconds, the signal received via the fibre on which the bidirectional communication is ongoing and to only perform the switching when a cutoff is proven and not following an isolated problem on the fibre. This monitoring period also makes it possible for each transceiver module kc-Tx-1 and kc-Tx-2 to stabilise and not to switch in a non-synchronised way, which could result in a general instability and very large disturbances.

This second embodiment has the interest of using identical modules on the central side and on the client side, which simplifies the management, the implementation and the maintenance of equipment.

The invention claimed is:

1. An optronic transceiver module capable of implementing an optical bidirectional communication of the point to point type via at least one main optical fibre the optronic transceiver module comprising:
  a first optical module for supervising an uplink signal received via the main optical fibre delivering a first supervision result;
  a first optical module for switching the bidirectional communication via the main optical fibre to a bidirectional communication via a backup optical fibre, and vice versa, the first optical switching module being controlled by the first optical supervision module depending on the first supervision result delivered;
  also comprising a second optical module for supervising an uplink signal received via the backup optical fibre delivering a second supervision result and controlling the first optical switching module; and
  wherein the first, respectively the second, optical supervision module comprises:

a first, respectively second, sampling uplink optical coupler capable of splitting at least one uplink optical signal received via the main optical fibre, respectively the backup optical fibre, into two optical signal split according to a predetermined power ratio for the split optical signals, the first, respectively second, sampling uplink optical coupler delivering a first, respectively second, low-power signal and a first, respectively second, high-power signal; and at least one first, respectively second, power measurement photodiode delivering a first, respectively second, power measurement associated with a first, respectively second, low-power signal.

2. The optronic transceiver module according to claim 1, wherein the first, respectively the second, optical supervision module also comprises at least one comparator delivering a comparison result of the first, respectively second, power measurement with at least one predetermined reference value, and comprising means for controlling the first optical switching module.

3. The optronic transceiver module according to claim 2, wherein the means for controlling the first optical switching module correspond to means for transmitting the comparison result to an entity external to the optronic transceiver module and wherein the optronic transceiver module comprises means for receiving, from the entity external to the optronic transceiver module, a command for controlling the first optical switching module.

4. The optronic transceiver module according to claim 1, comprising means for transmitting the first, respectively second, power measurement to an entity external to the optronic transceiver module and means for receiving, from the entity external to the optronic transceiver module, a command for controlling the first optical switching module.

5. A system for protecting a bidirectional communication of the point to point type via at least one main optical fibre between an optical line terminal and an item of client equipment in an optical communication network, the protection system comprising at least one first optronic transceiver module according to claim 1, connected to the optical line terminal and to the at least one main optical fibre and at least one second optronic, transceiver module connected to the item of client equipment, wherein the second optronic transceiver module is capable of receiving an uplink signal and transmitting a downlink signal on the main optical fibre and/or the backup optical fibre.

6. The system for protecting a bidirectional communication according to claim 5, wherein the at least one second optronic transceiver module comprises an optical interface comprising a transmitter module, a receiver module and a main optical coupler, capable of splitting the downlink optical signal from the transmitter module into two downlink optical signals substantially of the same power to be transmitted respectively in the two optical fibres, and capable of aggregating signals representative of the uplink signals received respectively via the two optical fibres, into a signal to be processed by the receiver module.

7. The system for protecting a bidirectional communication according to claim 5, wherein the at least one second optronic transceiver module comprises:

a third optical module for supervising a signal received via the main optical fibre delivering a third supervision result; and a second optical module for switching the bidirectional communication via the main optical fibre to a bidirectional communication via a backup optical fibre, and vice versa, the second optical switching module being controlled by the third optical supervision module depending on the third supervision result delivered.

8. The system for protecting a bidirectional communication according to claim 7, wherein the at least one second optronic transceiver module also comprises a second optical module for supervising a signal received via the backup optical fibre delivering a fourth supervision result and controlling the second optical switching module.

9. The system for protecting a bidirectional communication according to claim 7, wherein the first optical switching module and/or the second optical switching module corresponds to an optical switch.

10. A method of protecting a bidirectional communication of the point to point type via at least one main optical fibre between an optical line terminal, by means of at least one first optronic transceiver module, and an item of client equipment, by means of at least one second optronic transceiver module, in an optical communication network, the method comprising, implemented in the at least one first optronic transceiver module:

first supervising of the bidirectional communication via the main optical fibre by comparing the optical power received with an optical power reference value delivering a negative comparison result if the optical power received is below the optical power reference value; and switching of the bidirectional communication to a bidirectional communication via a backup optical fibre between the first optronic transceiver module and the second optronic transceiver module if the comparison result is negative, wherein the first supervision comprises before comparing the optical power, splitting an at least one uplink optical signal received via the main optical fibre, respectively the backup optical fibre, into a first, respectively second, low-power signal and a first, respectively second, high-power signal, and wherein the first, respectively second, low-power signal is used for comparing the optical power received with an optical power reference value, the first, respectively second, high-power signal being used for communication between the optical line terminal and the item of client equipment.

11. The method of protecting a bidirectional communication according to claim 10, wherein the first supervision is implemented periodically according to a predetermined period and wherein the switching is implemented when a predetermined number of negative comparison results are delivered by the first supervision.

12. The method of protecting a bidirectional communication according to claim 10 comprising, implemented in the at least one second optronic transceiver module:

second supervising of the bidirectional communication via the main optical fibre by comparing the optical power received with an optical power reference value delivering a negative comparison result if the optical power received is below the optical power reference value; and switching of the bidirectional communication to a bidirectional communication via the backup optical fibre if the comparison result is negative.

13. The method of protecting a bidirectional communication according to claim 12, wherein the second supervision is implemented periodically according to a predetermined period and wherein the switching is implemented when a predetermined number of negative comparison results are delivered by the second supervision.

\* \* \* \* \*